United States Patent [19]
Black

[11] 3,721,452
[45] March 20, 1973

[54] GASKET ASSEMBLY FOR PIPE FLANGES

[75] Inventor: Bobby E. Black, Chatsworth, Calif.

[73] Assignee: PSI Products, Inc., Burbank, Calif.

[22] Filed: Feb. 22, 1971

[21] Appl. No.: 117,376

[52] U.S. Cl. ..................277/9, 277/211, 277/235, 277/DIG. 10, 285/4
[51] Int. Cl. ..........F16j 9/04, F16l 55/00, F16l 21/02
[58] Field of Search..................285/3, 4, 363, 368; 277/DIG. 10, 9, 211, 11, 235 R

[56] References Cited

UNITED STATES PATENTS

| 2,442,312 | 5/1948 | Price | 277/11 |
| 1,869,577 | 8/1932 | Oberhuber | 277/211 |
| 3,480,301 | 11/1969 | Kroening | 277/180 X |

FOREIGN PATENTS OR APPLICATIONS

| 684,106 | 3/1930 | France | 277/9 |
| 1,917,326 | 10/1969 | Germany | 277/211 |

Primary Examiner—Samuel B. Rothberg
Attorney—Spensley, Horn & Lubitz

[57] ABSTRACT

This invention is a gasket assembly for positioning and sealing between pipe flanges and includes an annular seal portion together with a positioning member affixed to the periphery of the sealing portion. The positioning member includes a plurality of concentric separable annuli, the outer periphery of each annulus being adapted to mate with and be positioned by a bolt circle of a different diameter appropriate to pressure at which the gasket assembly and flanges are to be employed.

8 Claims, 5 Drawing Figures

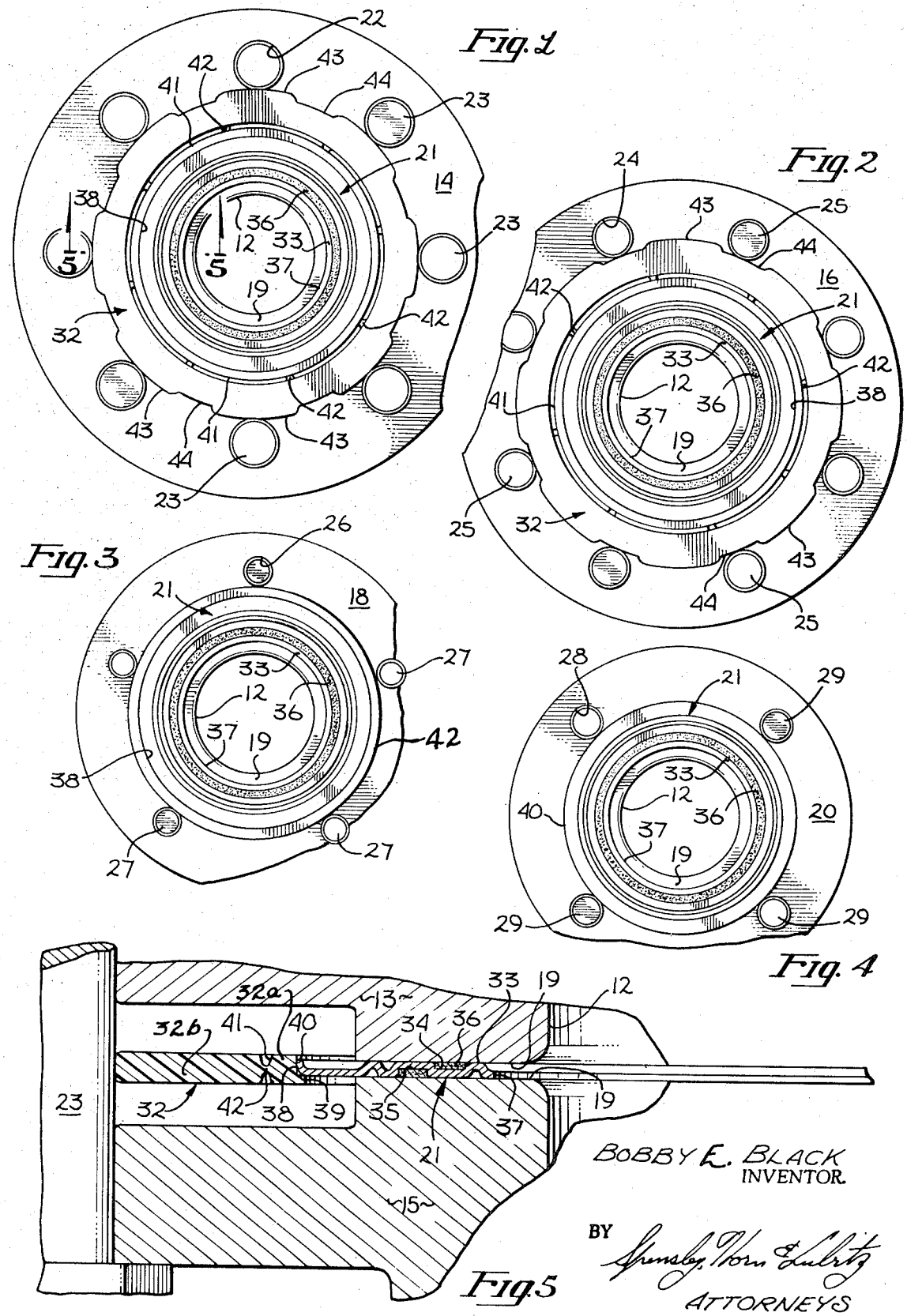

GASKET ASSEMBLY FOR PIPE FLANGES

BACKGROUND OF THE INVENTION

This invention relates to a gasket assembly and more particularly to an improved gasket assembly which includes a seal of the type adapted for sealing the interface between the mating parts of raised face pipe flanges and means for properly positioning the sealing element of the gasket between the interfaces of the mating parts.

Various types of seals and gaskets have been used in those applications where it is desired to seal the interface between the mating portions of pipe flanges. Dimensions and specifications of pipe flanges are determined by certain standards such as those of the USASI, i.e., the United States of America Standard Institute. These standards are the successor to the American standards, as, for example, American Standard ASA B 16.5, 1961, published by the American Society of Mechanical Engineers. In accordance with those standards, the diameter of the bolt circle for pipe flanges is determined for the diameter of the pipe and the pressure to which the pipe is to be subjected. The most common type of flange employed in high pressure applications is the raised faced flange. In raised faced flanges the standards specify that for a given pipe size the raised face of the adjacent flanges between which the seal is positioned, will be of a certain outside diameter. The inside diameter, of course, is determined by the pipe size. Additionally, the outside diameter of the flange, the number of bolts to be used, the bolt hole size and bolt circle diameter are specified and will differ for various pressures to which the flange is to be subjected. For example, considering a two inch pipe, if the pipe is to be subjected to 2,500 lbs. pressure then eight bolts are specified for the flange. The diameter of the bolt holes circle is 6 ¾ inches and the diameter of the bolt holes themselves is 1 ⅛ inches. If the flange is to be utilized for 2 inch pipe at 1,500 lbs. pressure, the diameter of the bolt circle is reduced to 6 ½ inches; eight bolts are still employed but the diameter of the bolt holes is 1 inch. It is essential that any sealing gasket utilized to seal between the mating interfaces of the pipe flange be concentrically positioned. It is the practice in the art to use the bolts as locators for the gasket. For example, in the prior art, a single steel ring has been affixed to the sealing portion of the gasket assembly which ring has an outside diameter equal to the inside diameter of the bolts when they are inserted into the flange. By having the gasket assembly butt up against the circle of bolts, the sealing element of the gasket assembly has been concentrically positioned with respect to the mating interfaces of the flanges. However, due to the fact that the bolt circle varies for different pressures for the same pipe size, it has been necessary in the prior art to make gasket assemblies having a common sealing portion but with various diameters of the positioning ring. Thus, a 2 inch seal, if designed for 2,500 lbs. pressure, has a positioning ring of the proper diameter to locate the sealing portion of the assembly at the mating interface. However, since the bolt circle used for positioning varies for different pressures a given gasket assembly can be used for that pressure only.

SUMMARY OF THE INVENTION

The present invention provides a gasket assembly for raised face pipe flanges which includes a sealing element surrounded by a positioning member of non-toxic, non-flamable material. The positioning member has an outer circumference with notched portions formed therein, the circumference of the gasket at its outermost surface being of the proper diameter for positioning at a predetermined first bolt diameter. The notches are formed in the outer periphery of the gasket positioning member to a depth at which they are matable with a bolt circle of lesser diameter. The gasket positioning member is formed of concentric separable annular portions such that when the outermost portion is separated from the inner concentric portion the outside diameter of the inner portion is matable with a third diameter of a bolt circle. One or more concentric separable portions may be utilized, and finally the sealing portion of the gasket itself is separable from the positioning assembly such that its outside diameter is mateable with a minimum diameter bolt circle.

The novel features which are believed to be characteristic of the invention, both as to its organization and method of operation, together with further objects and advantages thereof will be better understood from the following description considered in connection with the accompanying drawings in which the presently preferred embodiments of the invention are illustrated by way of example. It is to be expressly understood, however, that the drawings are for the purpose of illustration and description only, and are not intended as a definition of the limits of the invention.

DESCRIPTION OF THE DRAWINGS

FIG. 1 is a plan view of an illustrative gasket assembly in accordance with the present invention positioned within a bolt circle of the maximum diameter to which the gasket assembly is adaptable;

FIG. 2 is a view comparable to FIG. 1 but with the gasket assembly positioned within a bolt circle of lesser diameter than FIG. 1;

FIG. 3 is a view comparable to FIGS. 1 and 2 but with the outer separable portion of the gasket positioning assembly removed such that the gasket is now positioned by a bolt circle of lesser diameter than that of FIG. 2;

FIG. 4 is a view comparable to FIGS. 1, 2 and 3 but with the gasket positioning assembly removed from the sealing portion of the gasket such that the sealing assembly is now positioned by a bolt circle of lesser diameter than that of FIG. 3;

FIG. 5 is a view in section taken along line 5—5 of FIG. 1.

DESCRIPTION OF THE PREFERRED EMBODIMENT

Referring now to the drawing and particularly to FIGS. 1 and 5 thereof, the gasket assembly of the present invention includes a sealing portion 21 which is adapted to be placed in sealing relationship between the raised faces 19 of juxtaposed flanges 14 and 15 as shown in FIG. 5. For purposes of illustration, throughout all of the FIGURES a 2 inch pipe flange is shown as adapted for sealing 2 inch pipe under differing pressures. Thus, in FIGS. 1 and 5 there is shown a 2 inch pipe flange which meets the USASI specifications for use at 2,500 lbs. pressure. The inside diameter of the pipe and flanges is shown in FIG. 5 by the inside diameter of the flange at 12. In accordance with the design standards eight bolts 23 are used in a 2,500 lb. flange. The diameter of the bolt circle through the center of the bolt holes 22 in the 2,500 psi flange of FIG. 1 is 6 ¾ inches diameter and the diameter of the bolt holes is 1 ⅛ inch. In FIG. 2 a pipe flange 16 which meets the specifications for 900 and 1,500 lbs. pressure is shown. Eight bolt holes 24 are again provided on a circle through their centers which is 6 ½ inches in diameter. The bolt holes are 1 inch in diameter.

In FIG. 3 a pipe flange 18 for 300, 400 or 600 lbs. pressure is shown. The bolt hole 27 circle is 5 inches in diameter and the bolt holes are ¾ inch in diameter. In FIG. 4 a 2 inch pipe flange 20 for 150 lbs. pressure is shown with a bolt hole 28 circle at a diameter of 4 ¾ inches and bolt holes of ¾ inch diameter.

Referring again to FIGS. 1 and 5 the innermost diameter 37 of the sealing portion 21 of the gasket assembly in accordance with the present invention is greater than the 2 inch inside diameter of the pipe and the corresponding inside diameter of the flanges 14 and 15. In the presently preferred embodiment a sealing gasket 21 of deformable metal is employed. Thus, as shown particularly in FIG. 5, the sealing portion 21 is formed of malleable sheet metal which is configured to provide in cross section a pair of oppositely faced grooves 34 and 35 which are radially spaced apart and into which a deformable sealing material 36, such as an elastomeric, is positioned. When the mating pressure of the flanges is exerted upon the sealing portion 21 of the gasket assembly, the metal is deformed to compress the elastomeric material and provide a seal thereby and also to provide confining surfaces by the deformed faces of the metal such as at ridge 33.

At the outermost diameter of the metal sealing portion 21 of the gasket assembly, which outermost diameter is designated as 38 in the drawings, there is releasable affixed to the metal sealing portion 21 a positioning member 32 of the gasket assembly. The positioning member is formed of a plurality of concentric separable annuli. The positioning member is annular in overall configuration and generally rectangular in cross-sectional configuration and is adapted to provide three differing diameters in this illustrative embodiment. Those diameters correspond to the inside diameter of the flange bolts for various bolt diameters employed at different pressures of a 2 inch pipe flange.

Thus, the positioning member of the gasket assembly is formed in two interconnected but separable annular parts. The innermost positioning annulus 32a has an inside diameter 40 adapted to be mated with the outer circumference of the metal sealing portion 21 in a manner by which the metal portion can be snapped from the annular positioning portion. Thus, in the embodiment shown a lip 39 is provided to frictionally engage the metal portion at the outermost edge thereof, and an interference fit is provided between the circumferential surface 40 of the positioning member and the outermost circumference 38 of the sealing gasket. An outer annular portion 32b is attached to the inner portion 32a by connecting beads 42 circumferentially spaced between the inner portion 32a and the outer portion 32b. The beads 42 are of small cross-sectional extent so that they can be easily broken to remove the outer annular portion from the inner annular portion of the positioning member 32 such that the diameter of the positioner will be the outside diameter 41 of the inner annulus 32a. On the outer circumference of the positioning member 32, a configuration is provided, which forms a circumference of two diameters. This is done by forming the outer circumference with a series of circumferential notches as shown in FIGS. 1 and 2 such that the outermost circumference 32 is of one diameter whereas the circumferentially spaced notches define an interrupted circle of a lesser diameter 44. The outermost circumference 43 has a diameter which is proper for positioning in a bolt circle as shown in FIG. 1 and previously described. Thus, the diameter of the positioning member 32 at the outermost circumference 43 is in the illustrative embodiment, 6 ¾ inches minus 1 ⅛ inches. As shown in FIG. 5 the outermost circumference 43 will then abut against the flange bolts 23 of a 2,500 lb. - 2 inch flange. The positioning member 32 when the gasket assembly is to be used in a 2,500 lb. flange, is thus positioned so that the outermost circumference 43 is in contact with the bolts 23 to thereby concentrially position the sealing portion 21 between the interfaces 19 of the flanges.

Referring to FIG. 2, when the gasket assembly of the present invention is to be utilized on a flange for the next lesser pressure, which in this embodiment is 900 to 1,500 lbs., the positioning member 32 is rotated such that the lesser outside circumference 44 is in contact with the flange bolts 25 of the 2 inch pipe flange. Accordingly, the diameter of the lesser outer circumference at 44 is 6 ½ inches minus 1 inch and by rotating the gasket assembly through a partial turn until the notched portions are in engagement with the bolts 25 the gasket assembly is properly positioned for a 900 to 1,500 lb. raised face flange.

When the gasket assembly is to be utilized in a 300, 400 or 600 lb. application the outer annulus 32b of the positioning member 32 is broken away from the inner positioning annulus 32a, as shown in FIG. 3. The inner annulus has the proper outside diameter for the specified 300, 400 or 600 lb. pipe flange application. Thus, according to specifications for those pressures the bolt circle diameter is 5 inches and the diameter of the bolt hole is ¾ inches such that the outside diameter of the inner annular portion 32 as shown at 41 is 5 inches minus ¾ inches, and when positioned within the four bolts employed at those pressures the sealing portion 21 of the gasket assembly is again symmetrically positioned about the opening through the pipe flange.

At lower pressures, as, for example, 150 lbs., only four bolts are employed. For use at these pressures the entire positioning assembly 32 is snapped away from the metal sealing portion 21 of the gasket assembly and the outer diameter 38 of the sealing annulus 21 mates with the inner diameter of the four bolts 29, as shown in FIG. 4, to again symmetrically position the sealing gasket.

Although the present invention has been described in connection with an embodiment which accommodates four diameters of bolt circles with two separable positioning annuli, it can be seen that for other applications more than two separable annuli can be employed and more than four diameters can be accommodated. This is done in accordance with the present invention by utilizing more than two annuli and also by providing the outer periphery of the inner annuli with notches to accommodate more than one diameter of bolt circle at that peripheral edge.

The sealing portion 21 of the gasket assembly of the present invention can be formed of various materials and in various sealing configurations. As has been previously described in the presently preferred embodiment a combination of deformable metal and elastomeric material is used. Similarly, the positioning member 32 can be formed of various materials. It is required, however, that such materials be non-toxic and non-flammable. It is preferable that the material be one which can be molded. In the present embodiment the positioning member is molded of ABS plastic which is acrylonitride-butadiene-styrene which will not emit fumes at the temperatures encountered.

I claim:

1. A gasket assembly for raised face pipe flanges comprising:
   a sealing portion having an outer diameter and an inner diameter and being adapted to be positioned in sealing engagement between opposed faces of abutting pipe flanges;
   an annular positioning member engaging said outer diameter of said sealing portion so as to be removably affixed to and surrounding said sealing portion, said annular positioning member defining a plurality of arc segments of at least two radii, all having a common center substantially concentric to said sealing portion, said plurality of arc segments collectively defining at least two outer circumferences which respectively mate with the bolt circles of flanges adapted for different pressures to which the flanges are to be subjected.

2. A gasket assembly for raised face pipe flanges comprising:
   a sealing portion having an outer diameter and an inner diameter and being adapted to be positioned in sealing engagement between opposed faces of abutting pipe flanges;
   an annular positioning member, said annular positioning member having an inside diameter removably frictionally mated with the outside diameter of said sealing portion;
   said positioning member being a one piece member and having annularly separable portions to provide a plurality of outside circumferences mateable with the inside diameter of bolt circles of different diameters, said annularly separable portions being integrally joined and separable by breaking in a region therebetween.

3. A gasket assembly for sealing pipe flanges comprising:
   an annular sealing portion adapted to be positioned between the interfaces of opposed pipe flanges, said annular sealing portion having a supporting member of substantially uniform thickness with an outside diameter, an inside diameter and first and second faces, said supporting member having a pair of oppositely directed grooves, one on each of said faces, said grooves being radially spaced apart and each containing therein a deformable sealing material;
   a one piece positioning member, said positioning member being annular in configuration and having an inside diameter removably mated with the outside diameter of said sealing annulus, said positioning member including inner and outer concentric annuli whereby the outer diameter of the outer annulus is mateable within a bolt circle of first diameter and the outer diameter of the inner annulus is mateable within a bolt circle of second diameter less than the first diameter; and,
   means for separating said inner and outer annuli.

4. The apparatus as defined in claim 3 in which the inner and outer annuli are connected by a series of fracturable connections.

5. The apparatus as defined in claim 3 in which the outer peripheral edge of the outer annulus defines a plurality of arc segments of at least two radii, all having a common center substantially concentric to said sealing portion, said plurality of arc segments collectively defining at least two circumferences of different diameters each circumference being mateable with a bolt circle of different diameter.

6. The apparatus as defined in claim 3 wherein the outer annulus has an outermost peripheral diameter mateable with a bolt circle of first diameter, a series of notches in said outer periphery, said notches being mateable with a second bolt circle of lesser diameter than said first bolt circle.

7. The apparatus as defined in claim 6 in which said positioning member is formed of molded plastic.

8. The apparatus as defined by claim 7 in which the separable annuli of said positioning member are connected by fracturable beads.

* * * * *